United States Patent
Hickey et al.

(10) Patent No.: US 6,427,640 B1
(45) Date of Patent: Aug. 6, 2002

(54) SYSTEM AND METHOD FOR HEATING VEHICLE FLUIDS

(75) Inventors: John Curtis Hickey, Belleville; Robert Clayton Roethler, Howell, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/686,991

(22) Filed: Oct. 11, 2000

(51) Int. Cl.[7] .................................. F01P 1/06
(52) U.S. Cl. ........................ 123/41.31; 41/42
(58) Field of Search ................... 123/41.33, 196 AB, 123/41.1

(56) References Cited

U.S. PATENT DOCUMENTS

| | | |
|---|---|---|
| 2,844,129 A | 7/1958 | Bec, Jr. et al. |
| 3,162,182 A | 12/1964 | Gratzmuller |
| 3,229,456 A | 1/1966 | Gratzmuller |
| 3,232,283 A | 2/1966 | Toland |
| 3,921,600 A | 11/1975 | Henning et al. |
| 4,362,131 A | 12/1982 | Mason et al. |
| 4,520,767 A * | 6/1985 | Roettgen et al. ......... 123/41.33 |
| 4,535,729 A * | 8/1985 | Faylor ....................... 123/41.1 |
| 4,556,024 A | 12/1985 | King et al. |
| 4,627,397 A * | 12/1986 | Hayashi .................... 123/41.33 |
| 5,125,368 A | 6/1992 | Tzavaras |
| 5,285,963 A | 2/1994 | Wakefield et al. |
| 5,638,774 A * | 6/1997 | Albertson et al. ......... 123/41.33 |
| 5,730,089 A | 3/1998 | Morikawa et al. |
| 5,839,398 A * | 11/1998 | Hamilton ................. 123/41.33 |
| 5,887,562 A * | 3/1999 | von Esebeck et al. 123/196 AB |
| 5,896,833 A | 4/1999 | Aoki et al. |
| 5,960,872 A * | 10/1999 | Huemer et al. .......... 123/41.44 |
| 6,053,131 A * | 4/2000 | Mueller et al. .......... 123/41.33 |
| 6,098,576 A * | 8/2000 | Nowak, Jr. et al. ...... 123/41.33 |
| 6,196,168 B1 * | 3/2001 | Eckerskorn et al. ..... 123/41.33 |

FOREIGN PATENT DOCUMENTS

| | | |
|---|---|---|
| JP | 58-75163 | 5/1983 |
| JP | 58-75462 | 5/1983 |

* cited by examiner

Primary Examiner—Noah P. Kamen
Assistant Examiner—Jason Benton
(74) Attorney, Agent, or Firm—Ford Global Tech., Inc.

(57) ABSTRACT

A system 10 which utilizes engine coolant to selectively heat and cool fluid or oil used by another vehicle system, such as a transmission 14. System 10 includes a first cooling path or circuit 28 having a fluid-to-fluid heat exchanger 18 which is fluidly coupled to engine 12. The system 10 further includes a second fluid flow circuit 36, which contains and communicates transmission oil or fluid to and from transmission 14. Circuit 36 includes a conventional solenoid controlled shunt valve 22 which is fluidly coupled to transmission 14 and to fluid-to-fluid heat exchanger 18. Valve 22 is effective to selectively channel transmission oil through heat exchanger 18 based on one or more parameters (e.g., ambient temperature and transmission oil temperature), thereby relatively rapidly heating the transmission oil under certain operating conditions.

13 Claims, 4 Drawing Sheets

SYSTEM AND METHOD FOR HEATING VEHICLE FLUIDS

FIELD OF THE INVENTION

The present invention generally relates to a system and a method for heating vehicle fluids and more particularly, to a system and a method for heating vehicle fluids which utilizes one or more heat exchangers and bypass control valves to relatively quickly heat vehicle fluids such as oils, lubricants and other fluids used within various vehicle subsystems such as the transmission, steering system, transfer case, and engine.

BACKGROUND OF THE INVENTION

In order to cool an engine, a vehicle typically circulates a liquid coolant such as water through the engine and through a heat exchanger (e.g., a radiator) which allows the coolant or water to be desirably cooled. Once the water is heated, it can be used to heat the vehicle passenger compartment. Particularly, the heated water is selectively channeled through a heater core, while air is forced through the heater and communicated to the passenger compartment of the vehicle, thereby desirably increasing the temperature of the passenger compartment.

While these vehicle heating and cooling systems provide for a relatively efficient use of engine-generated heat, they suffer from some drawbacks. For example, the heated water is primarily used only to heat the passenger compartment. That is, these vehicle heating and cooling systems do not communicate heated water to other portions or systems of the vehicle which could benefit from the engine-generated heat. Thus, the fluids contained and/or used within these other systems undesirably remain in a cold and/or viscous state for an undesirably long period of time, thereby limiting the performance of these systems.

There is therefore a need for a new and improved system and method for heating vehicle fluids which overcomes some or all of the previously delineated drawbacks of prior systems.

SUMMARY OF THE INVENTION

A first advantage of the present invention is that it provides a system and method for heating vehicle fluids which overcomes some or all of the previously delineated drawbacks of prior heating systems and methods.

A second advantage of the present invention is that it provides a system and method for heating vehicle fluids which utilizes one or more fluid-to-fluid (e.g., oil-to-water) heat exchangers to efficiently and rapidly heat various vehicle fluids, such as transmission fluid, steering fluid, engine fluids, and other vehicle fluids and lubricants, thereby improving vehicle fuel economy.

A third advantage of the present invention is that it provides a system and method for heating vehicle fluids which utilizes an electronically controlled solenoid valve and an oil-to-water heat exchanger to relatively rapidly heat the vehicle's transmission oil, thereby improving vehicle fuel economy.

According to a first aspect of the present invention, a system is provided for heating and cooling fluids within a vehicle of the type including an engine and a transmission. The system includes an oil-to-water heat exchanger which is fluidly coupled to the engine and which receives heated water from the engine; and a valve which is fluidly coupled to the oil-to-water heat exchanger and to the transmission, the valve being effective to selectively channel transmission oil through the oil-to-water heat exchanger based on at least one parameter, thereby selectively heating the transmission oil.

According to a second aspect of the present invention, a system is provided for heating and cooling fluids within a vehicle of the type including an engine having a cooling fluid. The system includes at least one fluid-to-fluid heat exchanger which is fluidly coupled to at least one vehicle system and which receives fluid from the at least one vehicle system; and a valve which is fluidly coupled to the at least one fluid-to-fluid heat exchanger and to the engine, the valve being effective to selectively channel heated coolant from the engine through the at least one fluid-to-fluid heat exchanger based on at least one parameter, thereby selectively heating the received fluid from the at least one vehicle system.

According to a third aspect of the present invention, a method is provided for heating fluids within a vehicle of the type including an engine having an amount of coolant. The method includes the steps of providing a fluid-to-fluid heat exchanger; passing coolant heated by said engine through the fluid-to-fluid heat exchanger; and selectively passing fluid from a vehicle system through the fluid-to-fluid heat exchanger, effective to cause fluid to be heated by the heated coolant.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
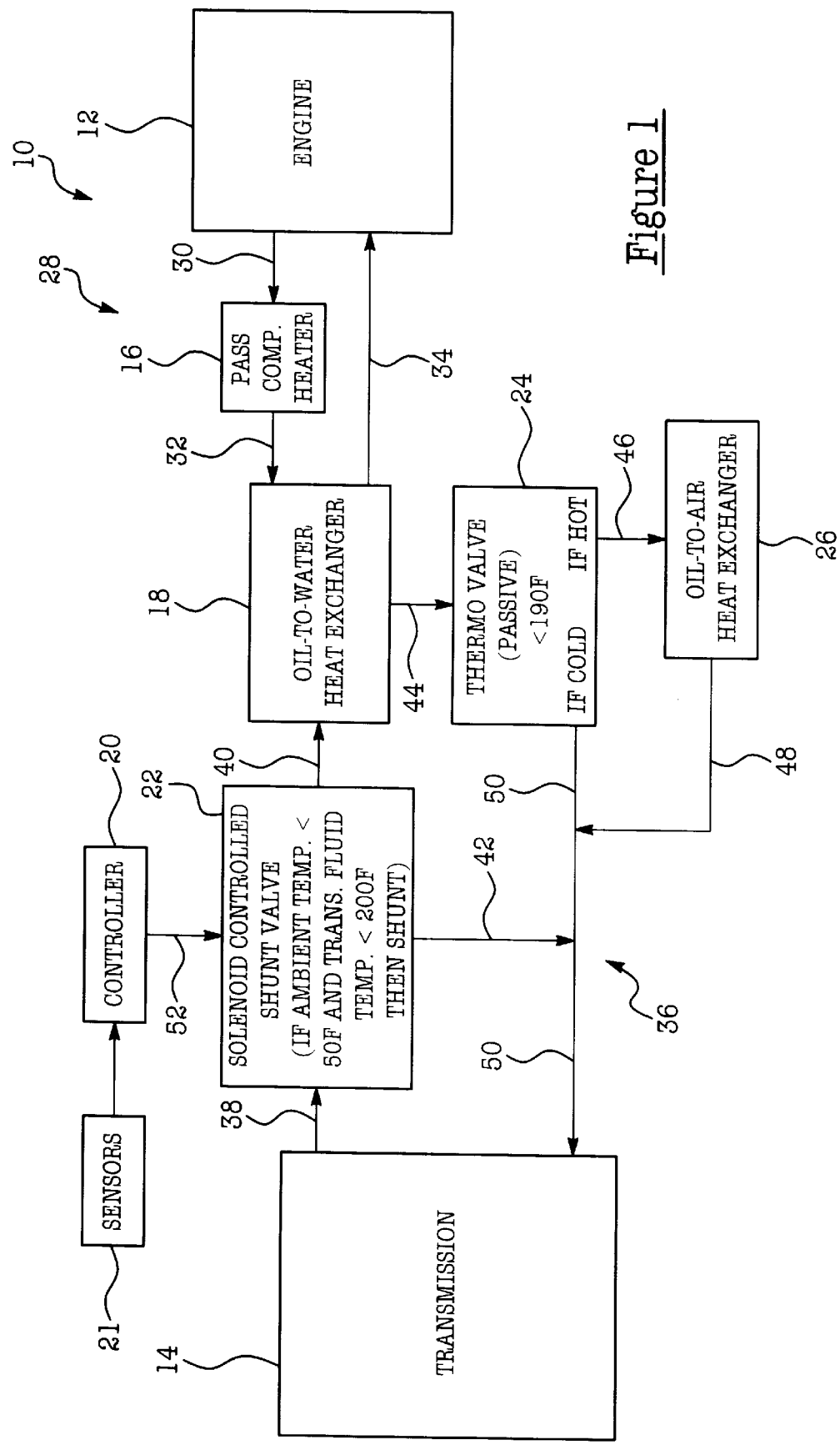
FIG. 1 is a block diagram of a system for heating vehicle fluids which is made in accordance with the teachings of the preferred embodiment of the invention and which is used to selectively heat and cool the transmission fluid of the vehicle.

Referring now to FIG. 1, there is shown a system 10 for heating vehicle fluids which is made in accordance with the teachings of the preferred embodiment of the invention and which further illustrates the system 10 being used to heat fluids used by the transmission system 14 of a vehicle. As discussed more fully and completely below, the present system can be used to concomitantly heat other fluids contained within various other subsystems of a vehicle.

System 10 utilizes engine coolant (e.g., water) to selectively heat and cool fluid or oil used by transmission 14. System 10 includes a first cooling path or circuit 28 through which the engine coolant or fluid flows. Cooling circuit 28 includes engine 12, a conventional passenger compartment heater 16 which is fluidly coupled to engine 12 by use of conduit 30, and a conventional fluid-to-fluid heat exchanger 18 which is fluidly coupled to heater 16 and engine 12 by use of conduits 32, 34, respectively. In the preferred embodiment of the invention, heat exchanger 18 comprises a conventional oil-to-water heat exchanger. It should be appreciated that, while not shown in FIG. 1, circuit 28 and/or engine 12 may further include conventional cooling circuit elements, such as a radiator, a thermostat, a coolant source or reservoir, and a conventional pump which drives the fluid or coolant through the cooling circuit 28. In one non-limiting embodiment, circuit 28 further includes a conventional exhaust gas-to-water heat exchanger, which when coupled to circuit 28 uses the heat from exhaust gasses to selectively increase the temperature of the water within circuit 28 during cold-temperature operating conditions (e.g., when the temperature of engine 12 is relatively cold).

System 10 further includes a second fluid flow circuit 36, which contains and communicates transmission oil or fluid to and from transmission 14. Circuit 36 includes transmission system 14; a conventional solenoid controlled shunt valve 22 which is fluidly coupled to transmission 14 by use of conduit 38 and to conduit 50 by use of conduit 42; a fluid-to-fluid heat exchanger 18 which is fluidly coupled to valve 22 by use of conduit 40; a thermostatically actuated valve 24 which is fluidly coupled to heat exchanger 18 by use of conduit 44 and to transmission 14 by use of conduit 50; and an oil-to-air heat exchanger 26 which is selectively and fluidly coupled to valve 24 by use of conduit 46 and to conduit 50 and transmission 14 by use of conduit 48.

Valve 22 is communicatively coupled to and is operatively controlled by a conventional controller 20 by use of bus 52. In the preferred embodiment of the invention, controller 20 is a conventional power train type control module operating under stored program control and is communicatively coupled to vehicle operating sensors 21. Controller 20 controls the operation of valve 22 based upon data (e.g., ambient and fluid temperature data) received from sensors 21. Sensors 21 are conventional vehicle attribute sensors which are effective to measure or sense certain vehicle attributes (i.e., the ambient temperature outside of the vehicle or within the vehicle passenger compartment, and the temperature of the vehicle's fluids) and to communicate signals to controller 20 representing those measured attributes.

In operation, water or fluid resident within circuit 28 is forcibly communicated through heater 16, oil-to-water heat exchanger 18 and engine 12 by use of conduits 30, 32 and 34. The communicated fluid is heated by the engine 12 and is passed through the heater 16 which uses some of the heat energy to heat the passenger compartment (e.g., by blowing air through the heater core). The fluid then travels through heat exchanger 18 before returning to engine 12.

Figure 2:
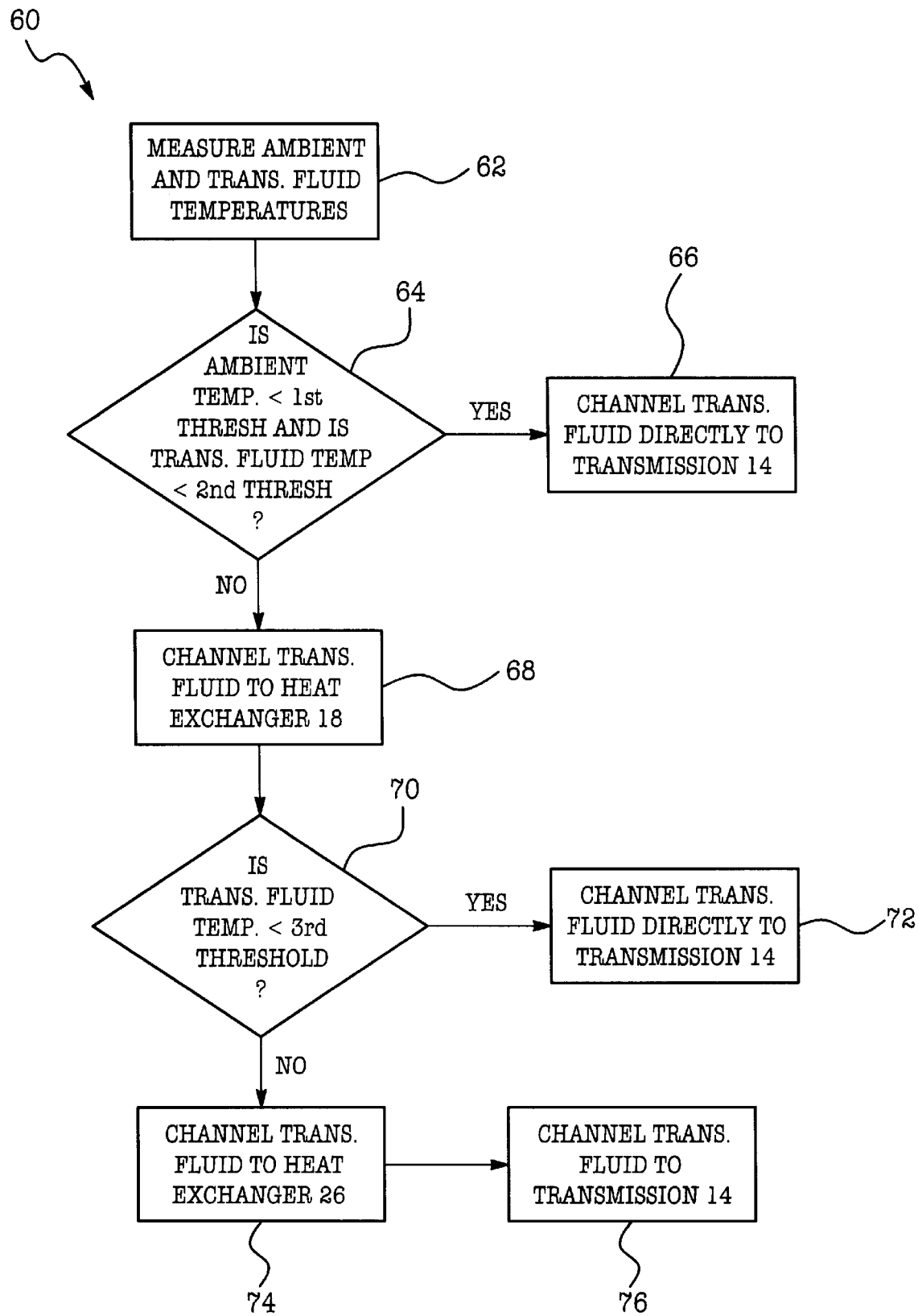
FIG. 2 is a flow diagram illustrating a strategy used by the system shown FIG. 1 to selectively heat and cool the transmission fluid.

The fluid flow path provided by circuit 36 is selectively controlled/altered by controller 20 and valve 22 based upon the ambient temperature outside of the vehicle and the temperature of the transmission fluid. One non-limiting example of a strategy used to determine the transmission fluid flow path provided by circuit 36 is illustrated in flow diagram 60 of FIG. 2. Strategy 60 begins with step 62, where controller 20 determines the ambient temperature and transmission fluid temperature by use of sensors 21. If the measured ambient temperature is less than a first predetermined threshold value, and the temperature of the transmission fluid is less than a second predetermined threshold value, controller 20 causes valve 22 to channel the transmission fluid directly back to the transmission system 14 through conduits 42, 50, as shown by steps 64 and 66. In one non-limiting embodiment, the first threshold value is equal to fifty degrees Fahrenheit (50° F.) and the second threshold value is equal to two hundred degrees Fahrenheit (200° F.).

If the ambient temperature is not less than the first predetermined value (e.g., 50° F.) or if the transmission fluid temperature is not less than the second predetermined threshold value (e.g., 200° F.), controller 20 causes solenoid valve 22 to channel the transmission fluid to heat exchanger 18 through conduit 40, as shown in steps 64 and 68.

After leaving heat exchanger 18, if the temperature of the transmission fluid is less than a third predetermined threshold value (e.g., 190° F.), the thermostatically actuated valve 24 will channel the heated transmission fluid directly to transmission 14, as shown by steps 70 and 72. Otherwise, if the temperature of the transmission fluid is equal to or greater than the third predetermined threshold value, the valve 24 will channel the transmission fluid through the oil-to-air heat exchanger 26, thereby cooling the fluid prior to channeling the fluid back to transmission 14 through conduits 48, 50.

In this manner, if the ambient temperature is relatively cold (i.e., less than 50° F.) when the vehicle is started, the present system 10 channels the transmission fluid immediately back to transmission 14 (e.g., through conduits 42 and 50) and does not cause the fluid to pass through heat exchanger 18. Hence, when it is relatively cold, heat exchanger 18 will not remove heat from the water within circuit 28, and substantially all of the heat energy within the water will be used to heat the passenger compartment.

When the vehicle is started and the ambient temperature is relatively mild (i.e., 50° F. or more), the transmission fluid will be channeled through heat exchanger 18 where the heated water from circuit 28 will desirably and relatively rapidly raise the temperature of the transmission fluid. Thus, in these circumstances, the present system 10 provides relatively quick heating of the vehicle's transmission fluid, thereby allowing the transmission 14 to operate more easily and efficiently and improving fuel economy.

Once the transmission fluid "heats up" (e.g., has a temperature equal to or greater than 200° F.), controller 20 will cause shunt valve 22 to continuously channel the fluid to heat exchanger 18. Heat exchanger 18 will use the water from circuit 28 to cool the hot transmission fluid, thereby desirably lowering the temperature of the transmission fluid. If the temperature of the transmission fluid leaving heat exchanger 18 is still relatively high (i.e., is equal to or greater than 190° F.), the thermostatically actuated valve 24 will channel the fluid through oil-to-air heat exchanger 26, thereby further cooling the fluid prior to channeling the fluid back to transmission 14 (e.g., through conduits 48, 50). If the fluid is sufficiently cooled after leaving heat exchanger 18, valve 24 channels the fluid directly to transmission 14 by use of conduit 50.

It should be appreciated that controller 20 may use various other vehicle attributes or parameters in controlling the operation of shunt valve 22. For example and without limitation, controller 20 may consider other parameters in making its determination regarding the operation of shunt valve 22 such as the amount of time the vehicle has been running, the temperature of the passenger compartment of the vehicle, the engine temperature, the engine speed, the engine load and/or any other suitable parameters. Moreover, thermostatic valve 24 can be replaced with another solenoid valve which is communicatively coupled to and controlled by controller 20.

Figure 3:
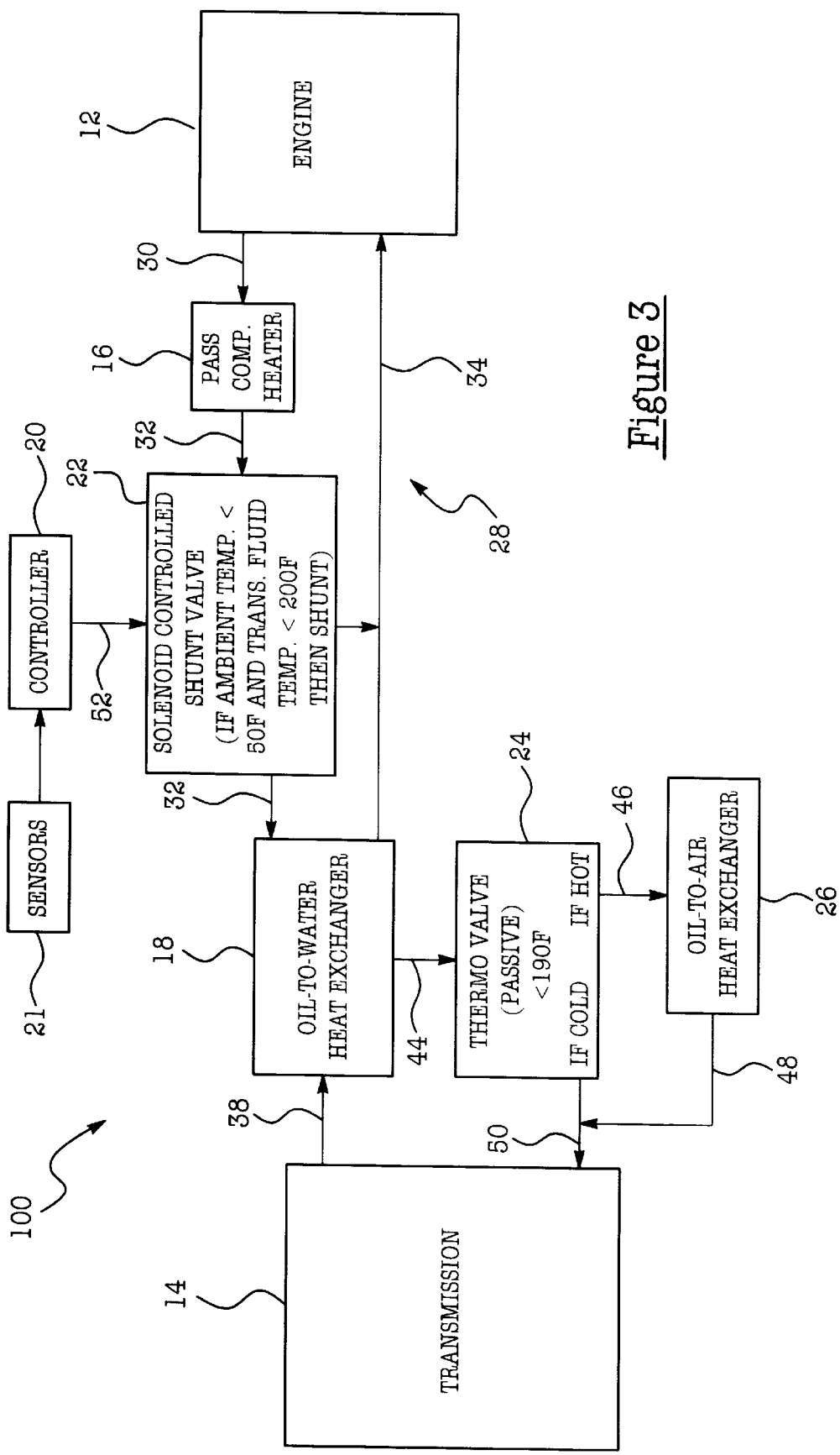
FIG. 3 is a block diagram of a system for heating vehicle fluids which is made in accordance with the teachings of a second embodiment of the invention and which is used to selectively heat and cool the transmission fluid of the vehicle.

Referring now to FIG. 3, in a second embodiment, shunt valve 22 is operatively placed within cooling circuit 28. Particularly, system 100 is substantially identical in structure and function to system 10 with the exception of shunt valve 22 which has been operatively disposed within conduit 32 and selectively controls the flow of water into heat exchanger 18.

System 100 operates in a manner substantially similar to system 10 to heat and cool the transmission fluid within circuit 36. Particularly, if the ambient temperature is relatively cold (i.e., less than 50° F.) when the vehicle is started, water within circuit 28 is channeled immediately back to engine 12 (e.g., through conduits 42 and 34) after passing through heater 16, and does not pass through heat exchanger 18. Hence, when it is relatively cold, heat exchanger 18 will not remove from the water within circuit 28, and substantially all of the heat energy within the water will be used to heat the passenger compartment.

When the vehicle is started and the ambient temperature is relatively mild (i.e., 50° F. or more), valve 22 allows the water within circuit 28 to be channeled through heat exchanger 18 where it heats the transmission fluid in circuit 36, thereby desirably and relatively rapidly raising the temperature of the transmission fluid. Thus, in these circumstances, the system 100 provides relatively quick heating of the vehicle's transmission fluid, thereby allowing the transmission 14 to operate more easily and efficiently.

Once the transmission fluid "heats up" (e.g., has a temperature equal to or greater than 200° F.), controller 20 will cause shunt valve 22 to continuously channel the fluid to heat exchanger 18. Heat exchanger 18 will use the water from circuit 28 to cool the hot transmission fluid, thereby desirably lowering the temperature of the transmission fluid. If the temperature of the transmission fluid leaving heat exchanger 18 is still relatively high (i.e., is equal to or greater than 190° F.), the thermostatically actuated valve 24 will channel the fluid through oil-to-air heat exchanger 26, thereby further cooling the fluid prior to channeling the fluid back to transmission 14 (e.g., through conduits 48, 50). If the fluid is sufficiently cooled after leaving heat exchanger 18, valve 24 channels the fluid directly to transmission 14 by use of conduit 50.

Figure 4:
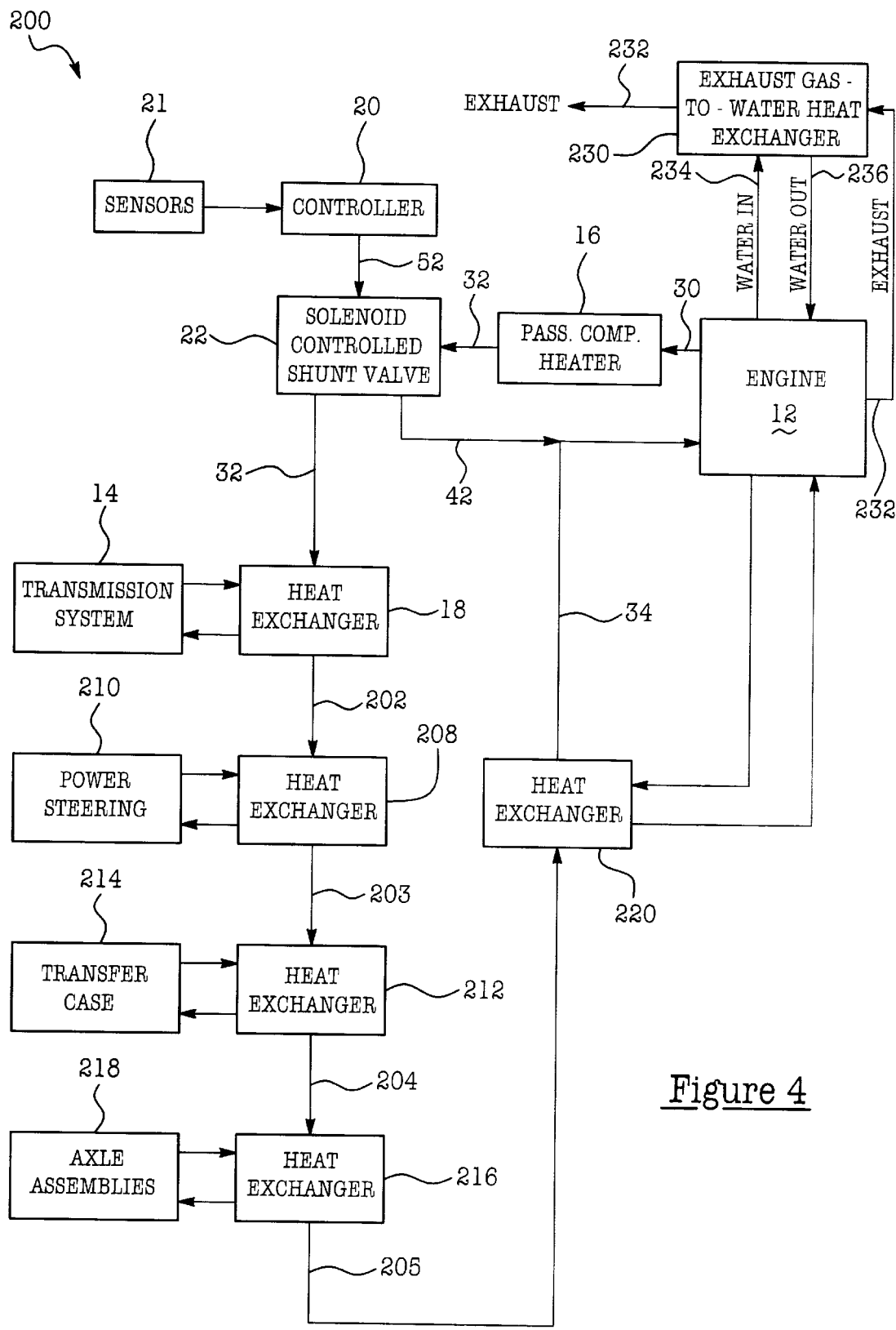
FIG. 4 is a block diagram of a system for heating vehicle fluids which is made in accordance with the teachings of an alternate embodiment of the invention.

It should be appreciated that the present invention can be used to concomitantly heat other fluids contained within various other subsystems of a vehicle. For example and without limitation, in one alternate embodiment, which is illustrated in FIG. 4, system 200 utilizes the engine water to heat the fluids in multiple subsystems of a vehicle. As shown in FIG. 4, system 200 is substantially similar to system 100 with the exception that several additional heat exchangers have been fluidly coupled "in series" with heat exchanger 18. Moreover, system 200 further includes an exhaust gas-to-water heat exchanger 230, which is fluidly coupled to engine 12 by use of conduits 232, 234 which respectively deliver engine coolant or water to/from heat exchanger 230. Heat exchanger 230 also receives burnt exhaust gasses from engine 12 by use of conduit 232 which is coupled to and/or forms a part of the vehicle's exhaust system. During cold-temperature operating conditions, heat exchanger 230 is effective to selectively increase the temperature of the engine water or coolant.

In this embodiment, after water passes through heat exchanger 18, it is channeled through heat exchangers 208, 212, 216 and 220 by use of conduits 202, 203, 204 and 205. Heat exchangers 208, 212, 216 and 220 are respectively and operatively coupled to power steering system 210, transfer case 214, axle assemblies 218 and engine 12, and are each effective to heat the fluids, oils and/or lubricants within those respective assemblies. In this embodiment, controller 20 may control the operation of valve 22 based upon various vehicle parameters, such as the amount of time the vehicle has been running, the ambient temperature outside of the vehicle, the temperature of the various fluids of the vehicle systems, the temperature of the passenger compartment of the vehicle, the engine temperature, the engine speed, the engine load and/or any other suitable parameters. By rapidly heating these fluids, the respective vehicle systems are able to operate at their optimum levels in a reduced amount of time. In this manner, system 200 is effective to improve overall vehicle performance, thereby achieving improved fuel economy and driving quality.

It is to be understood that the invention is not limited to the exact construction and method which has been delineated above, but that various changes and modifications may be made without departing from the spirit and the scope of the invention as is more fully set forth in the following claims.

What is claimed is:

1. A system for heating and cooling fluids within a vehicle of the type including an engine and a transmission, said system comprising:
   an oil-to-water heat exchanger which is fluidly coupled to said engine and which receives heated water from said engine;
   a controller which is operable under stored program control;
   a solenoid valve which is communicatively coupled to said controller, effective to electronically control said solenoid valve, said solenoid valve further being fluidly coupled to said oil-to-water heat exchanger and to said transmission, said electronically controlled solenoid valve being effective to selectively channel transmission oil through said oil-to-water heat exchanger based on at least one parameter, thereby selectively heating and cooling said transmission oil; and
   at least one sensor which is communicatively coupled to said controller and which is effective to measure said at least one parameter and to generate signals to said controller representing said measured at least one parameter, wherein said at least one parameter comprises a temperature of said transmission oil.

2. The system of claim 1 wherein said at least one parameter further comprises an ambient temperature outside of said vehicle.

3. The system of claim 1 wherein said at least one parameter further comprises a passenger compartment temperature of said vehicle.

4. The system of claim 1 further comprising:
   an oil-to-air heat exchanger; and
   a second valve which is communicatively coupled to said oil-to-water heat exchanger, to said oil-to-air heat exchanger and to said transmission, said second valve being effective to selectively channel transmission oil from said oil-to-water heat exchanger to said oil-to-air heat exchanger based on at least one second parameter, thereby selectively cooling said transmission oil.

5. The system of claim 4 wherein said at least one second parameter comprises transmission oil temperature.

6. A system for heating and cooling fluids within a vehicle of the type including an engine having a coolant, said system comprising:
   at least one fluid-to-fluid heat exchanger which is fluidly coupled to at least one vehicle system and which receives fluid from said at least one vehicle system;

a controller which is operable under stored program control;

a solenoid valve which is communicatively coupled to said controller, effective to electronically control said solenoid valve, said solenoid valve further being fluidly coupled to said at least one fluid-to-fluid heat exchanger and to said engine, said solenoid valve being effective to selectively channel heated coolant from said engine through said at least one fluid-to-fluid heat exchanger based on at least one parameter, thereby selectively heating said fluid received from said at least one vehicle system, wherein said at least one vehicle system comprises at least one of a transmission system, a steering system, an axle assembly, a transfer case and an engine;

at least one sensor which is communicatively coupled to said controller and which is effective to measure said at least one parameter and to generate signals to said controller representing said measured at least one parameter, wherein said at least one parameter comprises a temperature of said transmission oil.

7. A method for heating fluids within a vehicle of the type including an engine and a coolant which cools said engine, said method comprising the steps of:

providing a fluid-to-fluid heat exchanger;

passing coolant which has been heated by said engine through said fluid-to-fluid heat exchanger;

selectively passing fluid from a vehicle system through said fluid-to-fluid heat exchanger, effective to cause fluid to be heated by said heated coolant, thereby improving vehicle fuel economy;

providing a valve;

fluidly coupling said valve to said fluid-to-fluid heat exchanger and to said vehicle system;

selectively actuating said valve, effective to selectively pass fluid from said vehicle system to said fluid-to-fluid heat exchanger, thereby heating said fluid;

measuring at least one vehicle parameter; and selectively actuating said valve based upon said at least one vehicle parameter, wherein said at least one vehicle parameter comprises a temperature of said fluid.

8. The method of claim 7 wherein said at least one vehicle parameter comprises an ambient temperature outside of said vehicle.

9. The method of claim 7 further comprising the step of:

selectively heating said coolant by use of exhaust gas.

10. The system of claim 6 wherein said at least one parameter further comprises an ambient temperature outside of said vehicle.

11. The system of claim 6 wherein said at least one parameter further comprises a passenger compartment temperature of said vehicle.

12. The system of claim 6 further comprising:

a fluid-to-air heat exchanger; and a second valve which is communicatively coupled to said fluid-to-fluid heat exchanger, to said fluid-to-air heat exchanger and to said transmission, said second valve being effective to selectively channel transmission oil from said fluid-to-fluid heat exchanger to said fluid-to-air heat exchanger based on at least one second parameter, thereby selectively cooling said transmission oil.

13. The system of claim 12 wherein said at least one second parameter comprises transmission oil temperature.

* * * * *